United States Patent [19]

Dauksys

[11] 3,801,350
[45] Apr. 2, 1974

[54] HIGH MODULUS GRAPHITE FIBERS HAVING IMPROVED BONDING PROPERTIES

[75] Inventor: Richard J. Dauksys, Bellbrook, Ohio

[73] Assignee: The United States of America as represented by the Secretary of the Air Force, Washington, D.C.

[22] Filed: May 5, 1972

[21] Appl. No.: 250,714

[52] U.S. Cl. ............... 117/47 R, 117/62, 117/169 R
[51] Int. Cl. .......................... B44d 1/14, B44d 1/092
[58] Field of Search ........ 117/47 R, 228, 169 R, 62, 117/118, DIG. 11

[56] References Cited
UNITED STATES PATENTS

| | | | |
|---|---|---|---|
| 3,573,961 | 4/1971 | Hawkins et al. | 117/47 |
| 3,627,570 | 12/1971 | Cass et al. | 117/169 R X |
| 3,627,571 | 12/1971 | Cass et al. | 117/228 X |
| 3,635,675 | 1/1972 | Ezekiel | 264/29 X |
| 3,720,536 | 3/1973 | Scola et al. | 117/228 X |

Primary Examiner—William D. Martin
Assistant Examiner—Stuart D. Frenkel

[57] ABSTRACT

A process for improving the bonding properties of high modulus graphite fibers is provided that comprises treating the fibers with a solution of sodium iodate in aqueous dioxane; washing and drying the treated fibers; contacting the treated fibers with a solution of tin tetrachloride in 2-butanone; and heating the fibers to remove the 2-butanone. An epoxy resin composite having a greatly improved interlaminar shear strength is obtained when the treated graphite fibers are employed as a reinforcing material for epoxy resins.

5 Claims, No Drawings

HIGH MODULUS GRAPHITE FIBERS HAVING IMPROVED BONDING PROPERTIES

FIELD OF THE INVENTION

This invention relates to a process for treating high modulus graphite fibers so as to improve the bonding relationship between the fibers and resinous materials. In one aspect it relates to composites prepared from epoxy resins and the treated fibers.

BACKGROUND OF THE INVENTION

It is well known to use various reinforcing agents or fillers, such as carbon black, asbestos, glass fibers, silica, aluminum silicate and the like, to impart desired properties to elastomeric or resinous polymers. In recent years carbon and graphite fibers have been utilized extensively as reinforcing materials. And because of their very high modulus of elasticity, graphite fibers have proven to be very useful in fabricating structural composites that may be subjected to great stress as in aircraft and aerospace vehicles.

Epoxy resins or polyepoxides have been used as the matrix for graphite fibers in fabricating composites or laminates to be used, e.g., as structural members. However, a problem encountered with using epoxy resins as the matrix resides in the difficulty in establishing a strong bond or coupling between the fibers and the resin. Attempts have been made to overcome this problem by modifying the fibers, but any improvement in shear strength of the product has been accompanied by a degradation of other properties, e.g., tensile strength, by 25 percent or more.

It is an object of this invention, therefore, to provide a process for treating graphite fibers so as to improve their bonding relationship with epoxy resins.

Another object of the invention is to provide treated graphite fibers which, when used as a reinforcing material for epoxy resins, result in composites having an improved interlaminar shear strength.

A further object of the invention is to provide a composite comprising an epoxy resin matrix that has a high shear strength.

Other objects and advantages of the invention will become apparent to those skilled in the art upon consideration of the accompanying disclosure.

SUMMARY OF THE INVENTION

The present invention resides in the discovery of a process for modifying graphite fibers so as to improve their ability to bond to or couple with epoxy resins. The process comprises the steps of immersing the fibers in a solution of sodium iodate in water or aqueous dioxane; washing and drying the fibers; contacting the dried fibers with a solution of tin tetrachloride ($SnCl_4$) in a solvent therefor; and evaporating the solvent from the fibers. When graphite fibers so treated are employed in forming composites with epoxy resins, the resulting products possess an improved interlaminar shear strength with a minimal effect on other mechanical properties.

The graphite fibers used in the process are readily available from commercial sources. As precursors a variety of polymeric or resinous materials can be utilized such as cellulosic fibers, including regenerated cellulose or rayon yarns; polyacrylonitrile; copolymers of acrylonitrile and a minor amount of, e.g., methyl acrylate, vinyl acetate, styrene, vinyl toluene, vinylidene chloride, vinyl methyl phthalate, ethylene, and the like; polybenzimidazoles, such as poly-2,2'-(m-phenylene)-5,5(dibenzimidazole); aromatic polyamides; aromatic polyimides; petroleum pitch; and the like.

The graphite fibers are often prepared by a three-step process, involving preoxidation at 200° to 350° C followed by carbonization accomplished by heating the oxidized fibers in an inert atmosphere at 1,000° to 1,500° C. Thereafter, the carbonized fibers are heated in an inert atmosphere at a temperature ranging, e.g., from 1,800° to 3,000° C to provide graphite fibers. A method for preparing graphite fibers having a very high modulus of elasticity is disclosed in U.S. Pat. No. 3,635,675.

The epoxy resins with which the treated graphite fibers are employed are well known and are readily available from commercial sources. In "Polymer Processes," Interscience Publishers, Inc, pages 429–474 and 506–509 (1965), epoxy resins are described by C. E. Schildknecht. The polyepoxides, which are characterized by the presence of oxirane end groups, may be prepared, as described in the aforementioned publication, by the reaction between phenolic compounds and epichlorohydrin. Epoxy resins are also disclosed in numerous patents, including U.S. Pat. Nos. 2,643,239; 2,694,694; 3,098,056; and 3,403,131. Curing of the polyepoxides, which are usually in the form of a viscous liquid, may be accomplished by mixing and heating the polymer with from about 1 to 30 weight percent of a hardener or curing agent. In the normal curing operation, crosslinking occurs as a result of the interaction of the terminal epoxy groups, the curing agent and some of the pendant hydroxyl groups.

A large number of the commercially available resins are prepared by reacting epichlorohydrin and Bisphenol A [2,2-bis(4-hydroxyphenyl)propane]. Another example of an epoxy-type resin that is extensively used is epoxy-novolak resins prepared from the reaction of novolaks (phenol-formaldehyde resins) to attach epoxy groups to the polymer chain. The suppliers of epoxy resins generally furnish the hardening agent for the particular resin, together with information as to amount to use and the cure temperature and time. Examples of suitable hardening agents include polycarboxylic acid anhydrides, such as phthalic anhydride, pyromellitic anhydride, and maleic anhydride, which may be used with an amine accelerator, such as N-benzyldimethylamine or 2,4,6-tris(dimethylaminomethyl)-phenol.

From the foregoing discussion of graphite fibers and epoxy resins, it is seen that such materials are well known in the art. Furthermore, information concerning the materials are readily available in the literature and from manufacturers. The present invention is primarily concerned with the treatment of graphite fibers from any source and the composites prepared with the treated fibers using any epoxy resin as the matrix.

As indicated above, in the initial step of the process, the graphite yarn is immersed in a solution of sodium iodate in water or aqueous dioxane. The amount of dioxane used in the solvent can vary from about 0 to 80 volume percent, but it is usually preferred to use a solvent containing in the range of about 50 to 70 volume percent dioxane and 30 to 50 volume percent water. While the amount of sodium iodate contained in the solution can vary within rather wide limits, from about 25 to 200 grams of the compound per liter of solvent are generally used. During the immersion step, the solution is maintained from about ambient temperature to 102° C, preferably at a temperature ranging from about 80° to 90° C. The immersion time can vary within rather wide limits, e.g., from about 1 minute to 8 hours and longer. The amount of solution that is used is such as to obtain good contact between the fibers and the solution. For example, 1 liter of solution for 0.5 pound of fibers gives satisfactory results.

Upon completion of the immersion step, the fibers are removed from the solution and water washed. In the washing procedure, it is generally preferred to employ hot distilled water, e.g., water at a temperature ranging from about 50° to 80° C. Thereafter, the washed fibers are dried, preferably in a vacuum oven. The fibers remain in the oven for a period sufficient to ensure their being completely dried, and this is usually accomplished in from 30 minutes to 1 hour with the oven maintained at a temperature ranging from about 90° to 110° C.

The dried fibers are next contacted with a solution of tin tetrachloride in a suitable solvent therefor. The amount of tin tetrachloride used is generally in the range of about 0.2 to 1.0 volume percent of the solvent. Examples of solvents that can be used include acetone, 2-butanone, dimethylsulfoxide, dimethylformamide, ethyl alcohol, propyl alcohol, and the like. It is preferred to employ a ketone as the solvent. The contacting of the fibers takes place with the solution at about room temperature (25° C). The fibers are in contact with the tin tetrachloride solution for only a relatively short period of time, e.g., from about 15 to 60 seconds after which the fibers are heated to a temperature sufficient to evaporate the solvent. The temperature used will, of course, depend upon the particular solvent utilized in preparing the solution. Longer contact times, e.g., up to 30 minutes, can be used, particularly in batch operations. The heating step can be conveniently conducted by continuously passing the fibers under an infrared lamp although other well known methods can be used. Furthermore, it is to be understood that the solvent can be evaporated merely by allowing the fibers to stand at room temperature. The fibers that have been treated as described above are now eminently suitable for use as a reinforcing agent in the preparation of composites employing an epoxy resin as the matrix.

A more comprehensive understanding of the invention can be obtained by referring to the following illustrative examples which are not intended, however, to be unduly limitative of the invention.

EXAMPLE I

Two runs were conducted in which graphite fibers were treated in accordance with the process of this invention after which they were used with an epoxy resin to prepare composites. A control run was also conducted in which the same graphite fibers, but untreated, and the same epoxy resin were used in fabricating a composite.

The graphite fibers used were a product sold by Union Carbide under the trademark Thornel 50. The fibers had been sized with water. The product was in the form of a 2-ply yarn, twisted 1.5 to 2 turns per inch, having 720 filaments per ply. The yarn had a modulus of elasticity of $50 \times 10^6$ psi and a tensile strength of $325 \times 10^3$ psi. The single filaments had a diameter of about 0.0003 inch and a density of about 1.5 g/cc. Thornel 50 graphite fibers are prepared from a cellulosic precursor.

In carrying out the two runs according to the method of this invention, hereinafter designated as runs 1 and 2, the graphite fibers in the form of the described yarn were initially immersed in a sodium iodate solution contained in a vessel. The composition of each solution employed in the runs are shown below in Table I.

TABLE I

| Component | Run 1 | Run 2 |
|---|---|---|
| NaIO$_4$, gms | 34 | 54.5 |
| Dioxane, mls | 180 | 100 |
| Water, mls | 100 | 225 |

The yarn remained in the solution, which was maintained at 88° C, for a period of 30 minutes in run 1 and for a period of 2 hours and 40 minutes in run 2. The yarn was then removed from solution, washed with hot, distilled water, and dried for 45 minutes at 106° C under a vacuum.

After completion of steps as described in the preceding paragraph, the washed and dried fibers in each run were pulled successively through a room temperature solution containing 0.2 ml of tin tetrachloride (SnCl$_4$), in 50 mls of 2-butanone, under an infrared lamp to evaporate the 2-butanone, and through a solution of an epoxy resin. After passing through the solution of the epoxy resin, the fibers were wound on a cylindrical mandrel where a monolayer tape was formed. The epoxy resin system, which was one supplied by Union Carbide, had the formulation shown in Table II.

TABLE II

| | Parts by weight |
|---|---|
| Epoxy resin ERL 2256[1] | 100 |
| Hardener ZZL 0820[1] | 27 |
| 2-Butanone | 90 |

(1) Union Carbide identification symbol.

After appropriate B-staging (exposure overnight to atmosphere at room temperature), the tape was cut to mold dimensions. Ten plies of the tape were placed on top of one another in a steel mold and molded according to the manufacturer's recommendations. Thus, the mold was first heated at 180° F for 2 hours followed by heating at 300° F for 4 hours. The mold was cooled to ambient temperature between the heating cycles and was maintained at 100 psi during the cycles.

Another run, designated as run 3, was carried out, following the above-described procedure except that the graphite fibers were not treated according to the method of this invention.

The composites prepared in the three runs were tested to determine their interlaminar shear strength. The results of the tests are shown below in Table III.

TABLE III

| Components | Shear strength, $10^3$ psi |
| --- | --- |
| Run 1 | 6.4 |
| Run 2 | 5.6 |
| Run 3 (Control) | 3.5 |

From the data in the foregoing table, it is seen that the interlaminar shear strengths of composites prepared with graphite fibers treated according to the process of this invention were substantially greater than that of the composite fabricated with untreated graphite fibers. The greater shear strengths obtained indicate that there is an improvement in the coupling or bonding of the treated fibers to the epoxy resin. While it is to be understood that the present invention is not limited to any particular theory, it is believed that the improved bonding characteristics of the graphite fibers result from induced carbonyl functionality on the fibers and subsequent complexing with tin tetrachloride and reaction of the complex with oxirane groups of the epoxy polymer.

EXAMPLE II

A run is conducted in which the graphite fibers used are the same as those described in Example I. The fibers, as received from the manufacturer wound on a spool, are immersed for 30 minutes in a sodium iodate solution, water washed, and finally dried. The solution containing 122 grams of sodium iodate per liter of solvent is maintained at 88° C. The solvent consists of 357 mls of water and 643 mls of dioxane. Thereafter, the spool and dried yarn are immersed in a room temperature solution of stannic chloride in 2-butanone (0.4 volume percent $SnCl_4$) for a period of 20 minutes. The fibers impregnated with the stannic chloride solution are then wound directly onto a mandrel after passing through a vacuum oven to evaporate the 2-butanone solvent. The procedure described in Example I is then followed in preparing a composite having a shear strength comparable to those of Example I which were fabricated with the treated graphite fibers. The procedure described in this example has the advantage of eliminating the intermediate steps of the filament winding operation as described in Example I.

As will be apparent to those skilled in the art, modifications of the present invention can be made in view of the foregoing disclosure without departing from the spirit and scope of the invention.

I claim:

1. A process for improving the bonding properties of graphite fibers which comprises the steps of:
   a. immersing the fibers in a solution of sodium iodate in a solvent selected from the group consisting of water and aqueous dioxane;
   b. water washing and thereafter drying the fibers recovered from step (a);
   c. contacting the dried fibers with a solution of tin tetrachloride in a solvent therefor; and
   d. evaporating the solvent from the fibers recovered from step (c).

2. The process according to claim 1 in which the solvent for the sodium iodate contains in the range of about 50 to 70 volume percent dioxane and 30 to 50 volume percent water; the solution contains from about 25 to 200 grams of sodium iodate per liter of solvent; and the solution of tin tetrachloride contains from about 0.2 to 1.0 volume percent in tetrachloride, based on the solvent.

3. The process according to claim 2 in which the solution of sodium iodate is maintained at a temperature ranging from about ambient temperature to 102° C; the graphite fibers are immersed in the solution for a period of about 1 minute to 8 hours; and the dried fibers are contacted with the tin tetrachloride solution at room temperature for a period of about 15 seconds to 30 minutes.

4. The process according to claim 3 in which the solvent for the tin tetrachloride is a ketone.

5. The process according to claim 4 in which the ketone is 2-butanone.

* * * * *